(12) United States Patent
Manders et al.

(10) Patent No.: US 11,644,441 B2
(45) Date of Patent: May 9, 2023

(54) ACOUSTIC SURFACE IMAGING USING TIME OF FLIGHT

(71) Applicant: DarkVision Technologies Inc., North Vancouver (CA)

(72) Inventors: Graham Manders, North Vancouver (CA); Michael Halpenny-Mason, North Vancouver (CA)

(73) Assignee: DarkVision Technologies Inc, North Vancouver (CA)

( * ) Notice: Subject to any disclaimer, the term of this patent is extended or adjusted under 35 U.S.C. 154(b) by 566 days.

(21) Appl. No.: 16/783,060

(22) Filed: Feb. 5, 2020

(65) Prior Publication Data
US 2020/0249203 A1      Aug. 6, 2020

(30) Foreign Application Priority Data
Feb. 6, 2019     (GB) ..................................... 1901669

(51) Int. Cl.
*G01N 29/06* (2006.01)
*G01N 29/07* (2006.01)
(Continued)

(52) U.S. Cl.
CPC ......... *G01N 29/0654* (2013.01); *G01N 29/07* (2013.01); *G01N 29/225* (2013.01);
(Continued)

(58) Field of Classification Search
CPC .. G01N 29/225; G01N 29/041; G01N 29/265; G01N 29/0654; G01N 29/44; G01N 29/07; G01N 29/245; G01N 2291/011; G01N 2291/2636; G01N 2291/0234; G01N 2291/106; G01N 2291/0289; G01N 2291/056; E21B 47/0025
(Continued)

(56) References Cited

U.S. PATENT DOCUMENTS 5,007,291 A * 4/1991 Walters ................ G01N 29/223
226/176
5,108,693 A * 4/1992 Landry .................. G01N 29/30
976/DIG. 231
(Continued)

FOREIGN PATENT DOCUMENTS

WO          2015050778 A1    4/2015
WO     WO 2016/201583       12/2016

*Primary Examiner* — Jacques M Saint Surin

(57) ABSTRACT

A system, device and method for imaging, measuring and identifying surface features in a tubular, such as a casing, wellbore, or pipe. The device comprises an ultrasound transducer for sonifying an area of the surface of the tubular, with a pulse intercepting axial locations of the sonified area at different times. Reflected signals are processed using their time of flight to interpret the reflected signals as axial locations of features on the surface of the tubular. Multiple sonified areas are partially overlapped in the axial direction to capture features redundantly. Reflections from the multiple areas are combined to remove noise and strengthen reflections from real features. A geometric model of the surface of the tubular is rendered and displayed. Capturing larger areas per frame increases the logging rate and oversampling improves the resolution and signal to noise ratio.

20 Claims, 12 Drawing Sheets

(51) Int. Cl.
*G01N 29/22* (2006.01)
*G01N 29/24* (2006.01)
*G01N 29/265* (2006.01)
*G01N 29/44* (2006.01)

(52) U.S. Cl.
CPC ......... *G01N 29/245* (2013.01); *G01N 29/265* (2013.01); *G01N 29/44* (2013.01); *G01N 2291/011* (2013.01); *G01N 2291/0234* (2013.01); *G01N 2291/0289* (2013.01); *G01N 2291/106* (2013.01); *G01N 2291/2636* (2013.01)

(58) Field of Classification Search
USPC .......................................................... 73/597
See application file for complete search history.

(56) References Cited

U.S. PATENT DOCUMENTS

| | | | | |
|---|---|---|---|---|
| 5,581,037 A * | 12/1996 | Kwun | ............... | G01N 29/2412 |
| | | | | 73/622 |
| 5,717,169 A * | 2/1998 | Liang | ...................... | G01V 1/50 |
| | | | | 181/104 |
| 5,899,958 A * | 5/1999 | Dowell | .................. | E21B 47/26 |
| | | | | 702/6 |
| 6,813,950 B2 * | 11/2004 | Glascock | ............... | G01N 29/28 |
| | | | | 73/633 |
| 7,080,557 B2 * | 7/2006 | Adnan | ................... | G01N 29/28 |
| | | | | 73/644 |
| 8,746,070 B2 * | 6/2014 | Tippit, Jr. | ............ | G01N 29/221 |
| | | | | 73/620 |
| 2018/0011211 A1 * | 1/2018 | Leonard | ............... | G01N 29/221 |

\* cited by examiner

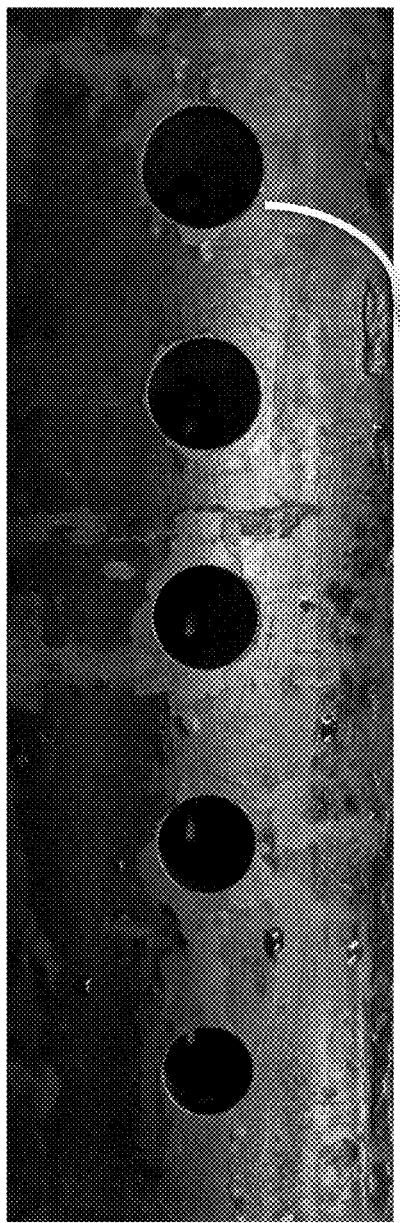 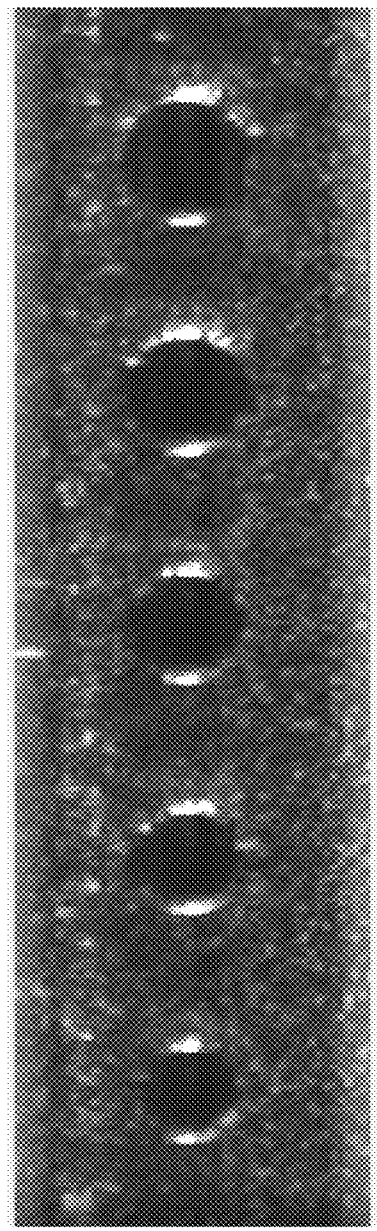
Fig. 8A                    Fig. 8B

ACOUSTIC SURFACE IMAGING USING TIME OF FLIGHT

FIELD

The field relates generally to inspecting a tubular, such as a well or pipe. In particular, the invention relates to methods and devices for imaging surface features using acoustic waves.

BACKGROUND

Lengths of pipes and wells are commonly inspected to assess their condition. For example, the metal may become corroded, pitted, or thinned. Additionally, the location and state of engineered features such as valves, drilled holes, and perforations may be measured. Such tubular inspection is commonly performed by tools equipped with cameras, ultrasound arrays, x-ray detectors, and magnetic sensors. Ultrasound is particularly useful in hydrocarbon wells where fluids are visually opaque but still pass sound waves.

As these pipes and wells may be several kilometers long, the logging speed of the tool becomes an issue. Such tools may be deployed on coiled tubing, tractor, wireline or pumped down using fluid pressure to move thru the tubular. To obtain high resolution images, the transducer array must capture a frame every few millimeters. However, at practical memory limits, frame rates and processing speeds, it becomes very difficult to log wells that are many kilometers long.

Existing ultrasound tools comprise an array of piezoelectric elements distributed radially around the tool housing. The top surface of each element faces radially away from the tool towards the wall of the tubular. The reflected waves are received by the same elements and the pulse-echo time of the waves are used to deduce the distances to the inner and outer walls and voids therebetween. The elements may be angled slightly off radial, such that some of the energy reflects away from the transducer and some backscatters off features, per PCT Application WO 2016/201583 published Dec. 22, 2016, to Darkvision Technologies. If the angle of incidence is too high (measured from the surface normal), most of the energy is reflected away and little energy penetrates the back off the pipe.

An acoustic wave created by one or more of these elements is focused by a lens and/or through time-delay beamforming, such that energy is generally focused along a line to form a what is called a scanline. The scanlines are then assembled to form one frame that approximates one planer or conical shaped slice of the well. Thus the processor can treat the reflections as resulting from features at that precise spot to achieve a resolution of the spot size. The spot of interest in the next frame will move about one spot size in the direction of logging. These slices are assembled into a 3-D volume in a process called slice stacking.

SUMMARY

In accordance with the invention, there is provided a system for inspecting a tubular. The system comprises an image device having an acoustic transducer (preferably operating in the ultrasound band) and an elongate housing defining an axial direction, the transducer arranged to sonify an area of the surface of the tubular with a pulse that intercepts axial locations of said area at different times. A processor is arranged to receive reflected signals from the transducer and to interpret the reflected signals using their time of flight as axial locations of features on the surface of the tubular.

The transducer may comprise a plurality of transducer elements, the device further comprising a circuit to activate a subset of the transducer elements as a phased array to sonify the area and to receive reflections.

The transducer elements may be separated radially around the housing, emitting and receiving phased scan lines at multiple azimuths of the device.

The system may comprise apparatus for moving the device axially through the tubular.

The processor may be further arranged to shift and combine signals from the transducer at a plurality of partly overlapping sonified areas.

The processor may be further arranged to calculate attributes of the reflection signals and identify surface features from those attributes.

The ultrasound transducer may be arranged to emit a defocused beam to the sonified area.

The sonified area may be longer than 5 mm in an axial direction of the tubular, preferably longer than 10 mm.

The ultrasound pulse may sonify said area at an angle of incidence selected between 20 and 70°, measured from a surface normal, preferably selected between 30 and 70°.

The system may comprise a reflector of the device arranged to reflect ultrasound waves from the transducer to the sonified area.

The focal point of the transducer may be one of: radially inward of the transducer; radially inward of the surface, radially outward of the surface, or at infinity.

The transducer may be arranged to rotate about the axial direction of the device and sonify the surface at plural azimuths.

In accordance with the invention, there is provided a method of operating an imaging device comprising an ultrasound transducer to inspect a tubular. The method comprises: deploying and moving the imaging device axially through a tubular; generating an ultrasound pulse with the ultrasound transducer to sonify an area of the surface of the tubular, which pulse intercepts axial locations of the sonified area at different times; and processing reflection signals from the transducer using their time of flight to interpret reflection signals as axial locations of features on the surface of the tubular.

The method may repeat the step of generating an ultrasound pulse to sonify multiple areas that are partially axially overlapping.

The method may shift and combine reflected signals from the multiple sonified areas to remove noise and reinforce reflections from features.

The method may process reflection signals from the multiple sonified areas to calculate registration of features on the surface.

The method may comprise moving the device through the tubular at a speed relative to a frame rate, such that surface features are captured by multiple frames, preferably at least 3 frames, more preferably at least 5 frames.

The method may render the reflection signals as a geometric model of the surface of the tubular and displaying the model to a user.

The method may sonify the area at an incidence angle selected between 20 and 70°, more preferably 30-70°.

The method may sonify a second area of the surface substantially perpendicular to the tubular surface and process the reflection signals from the second area to determine depth data of the tubular.

The method may comprise rotating the transducer to sonify the surface at plural azimuths of the device in a frame.

The method may comprise stitching together radially adjacent reflection signals from each frame to render slices for a geometric model of the tubular.

The method may comprise moving the transducer towards the surface of the tubular, generally adjacent the surface, preferably within 5 centimeters of the surface.

BRIEF DESCRIPTION OF THE DRAWINGS

Various objects, features and advantages of the invention will be apparent from the following description of embodiments of the invention, as illustrated in the accompanying drawings. The drawings are not necessarily to scale, emphasis instead being placed upon illustrating the principles of various embodiments of the invention.

FIG. 8A is a photo of a tubular under inspection.

FIG. 8B is an acoustic image of the tubular generated with embodiments of the invention.

Figure 1:
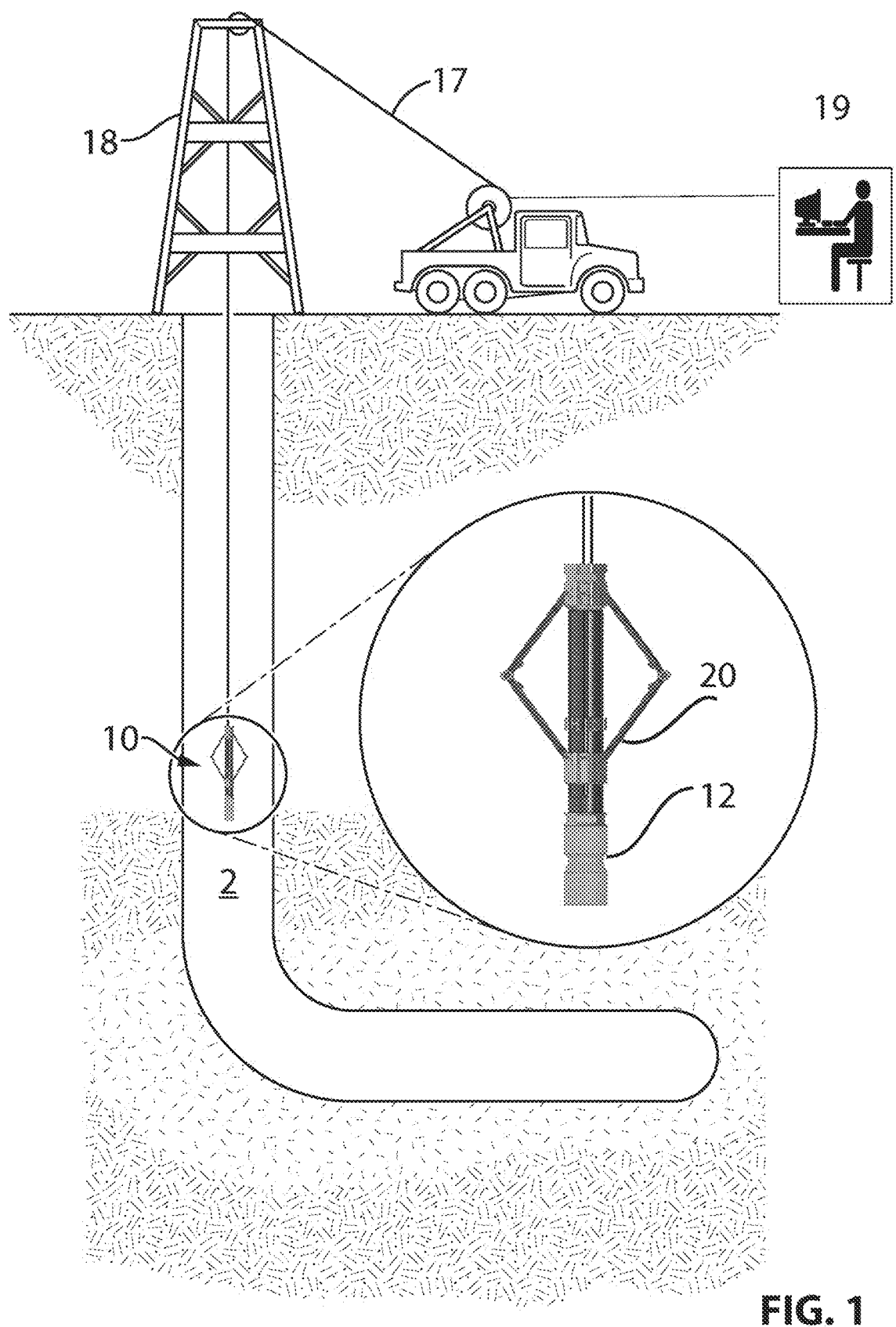
FIG. 1 is an overview of an operations site for imaging a well.

Similar reference numerals indicate similar components having the following key:
2 tubular such as an oil well, wellbore, tubing, casing or pipe;
10 downhole device;
11 scanline;
12 acoustic transducer;
14 device image/control circuit;
15 sonified area;
16 housing;
17 wireline;
18 operations site;
19 surface computer;
20 centralizers;
22 reflector;
26 translation movement;
30 outer surface of the tubular;
31 inner surface of the tubular;
51 perforations in a casing;
80 analogue Front End;
81 HV Pulser;
82 HV Mux/Demux;
83 HV Protection switch;
84 FPGA;
85 ADC;
86 Amplifiers (including DVGA, LNA, and Summing Amps);
87 Signal processor;
88 Rx beamforming; and
89 Tx beamforming.

DETAILED DESCRIPTION

With reference to the figures, a device and method for imaging the surface of tubular are described. In accordance with one embodiment of the invention, there is provided an imaging device 10 deployable by a wireline 17 at an operations site 18 for imaging features in a tubular 2, illustrated in FIG. 1. The imaging device 10 generally comprises at least one acoustic transducer 12, a deployment system 17, and optionally one or more centralizing elements 20. Tubular 2 may be used to transport or access water, oil or gas. This term is intended to include cased wells, uncased wells, open holes, boreholes, water pipelines, oil pipelines, tubing, and boiler tubes.

The ultrasound transducer may be a single element or comprise a plurality of transducer elements, typically arranged as an array, preferably a radial array. In the simplest case, a single elements sonifies a single spot to provide an image of that area. However, in preferred cases, the single transducer is a spinning transducer that rotates about the longitudinal axis of the device, sonifying multiple areas, sweeping out a helix, as the device moves axially.

In a preferred embodiment of an array, plural elements (i.e. an aperture) cooperate as a phased array to sonify an area. This may be a single area of interest. However preferably, plural elements of the radial array are electrically selected and beam steered to provide multiple scan lines to sonify multiple areas in a frame. As the device moves axially, multiple frames redundantly capture areas to image a large section of the tubular.

The transducer directs acoustic waves, towards the surface at a high angle of incidence such that the majority of the reflected wave is from surface features, rather than depth features. The present device and method are most useful to image a flat surface, at least flat along the direction of the scan line. The optimal system design and operating settings is a tradeoff of logging speed, wavelength, focus, sonified area, frame rate, overlap, and angle of incidence, which may be optimized per job based on the well's diameter, fluid, or surface roughness. In the following discussion, preferred embodiments and ranges are given based on practical parameters, such as Signal to Noise ratio and feature resolution.

The angle of incidence is preferably greater than the critical angle, determined by the speeds of sound for a wave passing from well-fluid to tubular material using Snell's Law. Most of the sound wave will bounce off a metal tubular from water (i.e. and thus will not enter the tubular), at angles of incidence above 30°. At the other end of the range, angles of incidence greater than 70° return too little signal and the surface features are shadowed and occluded by other features. Thus the preferred angle of incidence (measured from the surface normal) may be set at 30 to 70°. Surface features in the reflected waves can be discriminated based on their Time of Flight (TOF), provided that the sampling period of the electronics is shorter than half of the separation in arrival time of pulses. Thus, a higher angle of incidence and higher sampling rate provides a higher longitudinal resolution, but with less signal strength. The inventors have found that a preferable angle of incidence is selected between 30-70°.

In an alternative embodiment, the transducer sonifies the tubular at an incidence angle of 20-30° (i.e. less than the critical angle). Here, although some of the acoustic energy enters the tubular, the processor can separate the internal and surface features using a correlation computation between two successive frames that share some surface features, preferably ignoring reflections from deeper features (i.e. later in time than the initial surface reflections). A high frame rate is desirable here to ensure that features are captured plural times within the small sonified area.

Transducers

The device 10 comprises an acoustic transducer, which transducer is preferably an array of plural transducer elements. An acoustic scan line is generated and received using phase delays for a subset of elements, called the aperture.

The frequency of the acoustic waves generated by the transducer(s) is generally in the range of 200 kHz to 30 MHz, and may be dependent upon several factors, including the fluid types, velocities in the well, and the speed at which the imaging device is moving. In most uses, the wave frequency is ultrasonic, operating between 1 and 10 MHz. Higher frequencies (shorter wavelengths) are able to discriminate finer features on the surface by returning distinct reflections from each feature. This does require greater sampling rate, data processing and data memory. The frequency can be manually or automatically changed based on the velocity of the device and/or fluids in the well.

The number of individual elements in the transducer array affects the resolution of the generated images. Typically, each transducer array is made up of 32 to 2048 elements, preferably 128 to 1024 elements. The use of a relatively large number of elements generates a fine resolution image of the well in the plane of the array. The transducers may be piezoelectric, such as the ceramic material, PZT (lead zirconate titanate). Such transducers and their operation are well known and commonly available. Circuits 15 to drive and capture these arrays are also commonly available.

The number of transducer elements, their pitch, and driving frequency $\lambda$ affect the imaging quality. In acoustic transducers, a useful rule is that the pitch should be in the range of $\lambda/2$ and $\lambda$ to minimize grating lobes. Thus, in one embodiment, there may be 128 elements, spaced 300 µm (equal to $\lambda$) apart, driven at 5 MHz in water.

Figure 4:
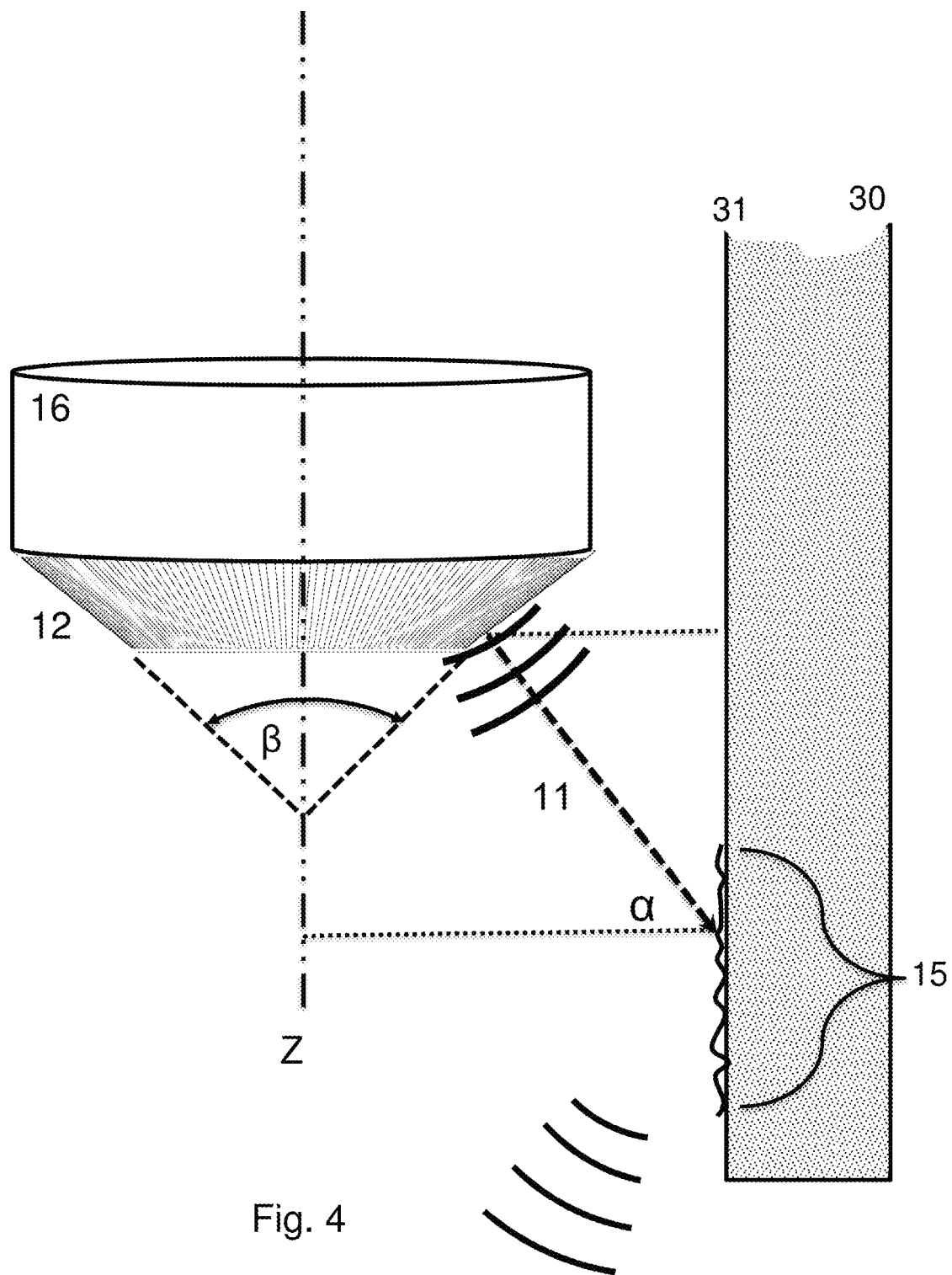
FIG. 4 is an illustration of acoustic waves interfacing a surface of a well.

As shown in FIG. 4, the radial transducer is a 1D array of transducer elements 12 separated radially around the body of the device. The geometry of the transducer (including any lens and reflector) directs a pulse 11 outward to sonify the surface of the tubular.

When the array faces the purely radial direction, known as a thickness probe, the reflections indicate the distance to surfaces and defects in the walls. When the radial array is formed on a frustoconical surface, at a cone angle of 30-60°, the wavefront is directed partially toward the longitudinal axis and reflects surface and depth features from a focused spot. As the cone angle $\beta$ increases, the angle of incidence $\beta/2$ increases, the angle from of the longitudinal axis decreases (90°−$\beta/2$) and thus the amount of reflections due to surface features increases. There is a corresponding reduction in depth reflections.

Figure 3:
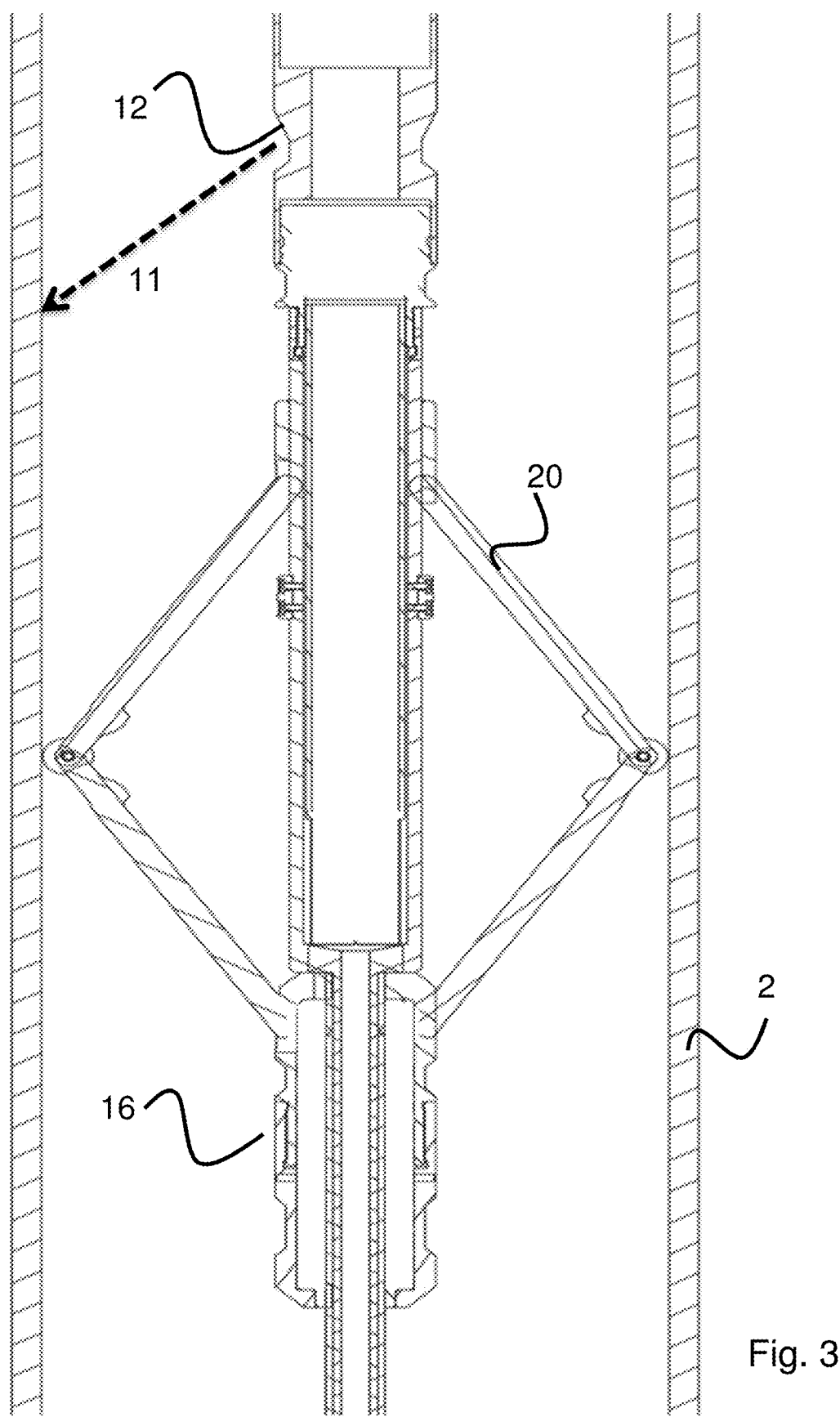
FIG. 3 is a cross-sectional view of an imaging device in a well.

In a preferred embodiment of the invention as shown in FIG. 3, the transducer elements 12 radially outward and axially to create a high angle of incidence, such as 30-70°. Thus the majority of reflections correspond to surface features protruding or recessed from the otherwise flat surface. As the device is moved axially in the well, in either a downhole or uphole direction, the cone-shaped transducer continually captures axially overlapping areas on the surface of the well, which are stitched together with radially adjacent scan lines to generates a 2D image of the well surface. The radial transducer array should be oriented and positioned, such that its center and longitudinal axis is concentrically aligned with the tubular (i.e. the device is preferably centered within the tubular).

Figure 2A:
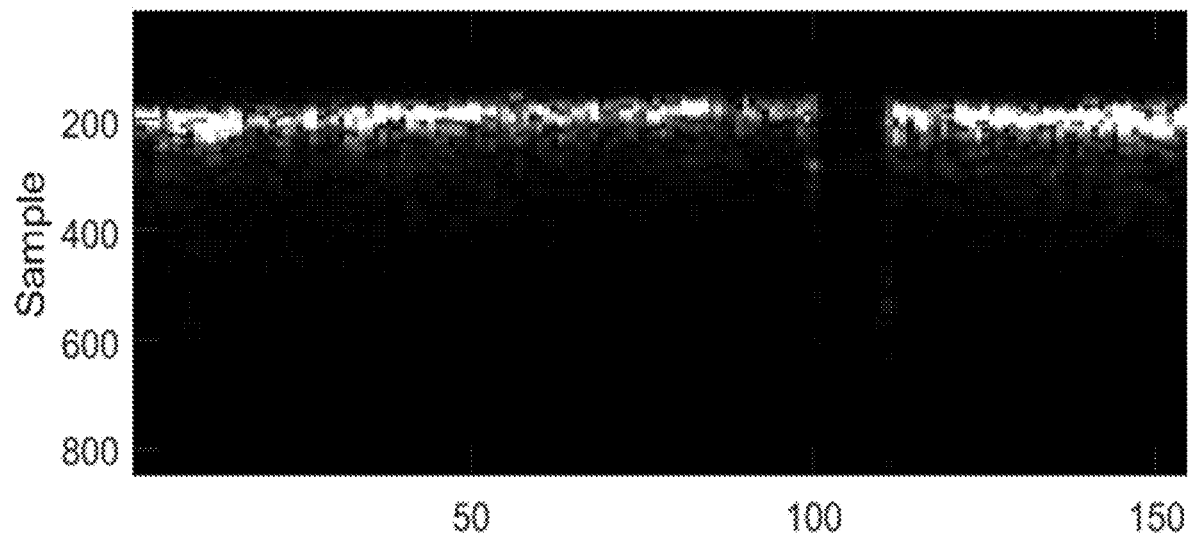
FIG. 2A is a single frame captured by prior acoustic systems.

In prior systems, the array of acoustic transducers is arranged to focus on a spot of interest in order to reflect back as much energy as possible. The focus may be at the surface of the well or a void therewithin. FIG. 2A shows a single frame of 150 scan lines, each line sampled at 800 times. Starting around sample 200, surface reflections are received, followed by deeper reverberations. Scan lines 100-110 line up with a thru hole and simply receive no reflections.

Figure 2B:
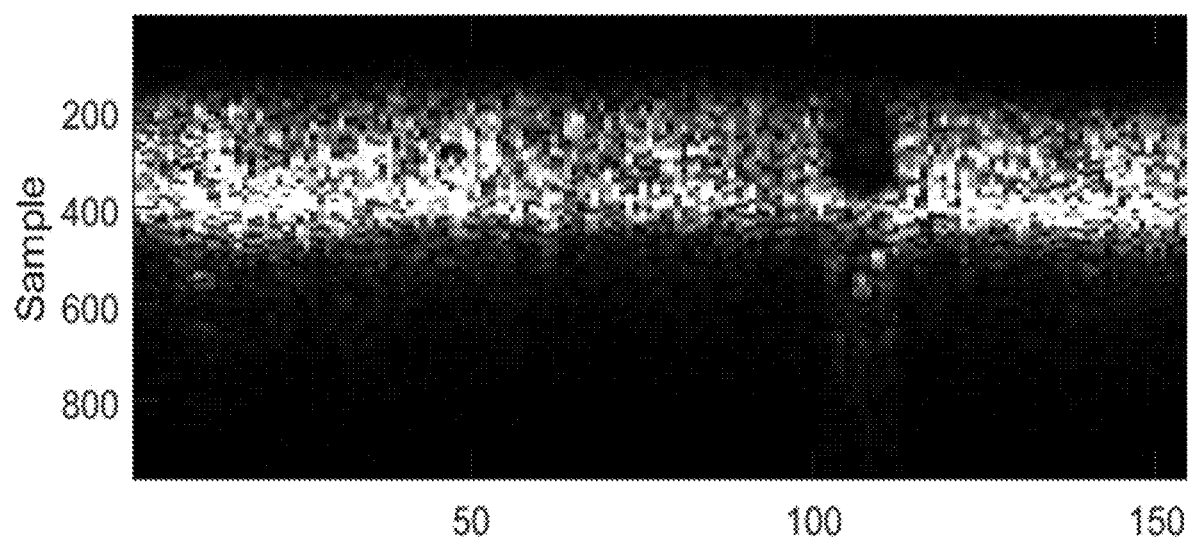
FIG. 2B is a single frame captured by the present system.

In contrast to such systems, the present imaging device does not focus the wave at the surface of the wall but rather spreads the wave energy over an area (sonified area 15 in FIG. 4). The intention is to capture multiple surface features in a single scan line. Preferably the geometry of the lens or reflector is arranged to emit a defocused, or collimated wave to the surface. FIG. 2B shows a single frame of 150 surface scan lines, each line sampled at 800 times. Here each scan line provides 1D surface features (not depth data, per FIG. 2A), and the single frame is capable of capturing the shape of the thru hole. That is, a single frame provides 2D surface images and the system does not need to wait for or accurately line up subsequent frames to measure the hole.

Figure 5:
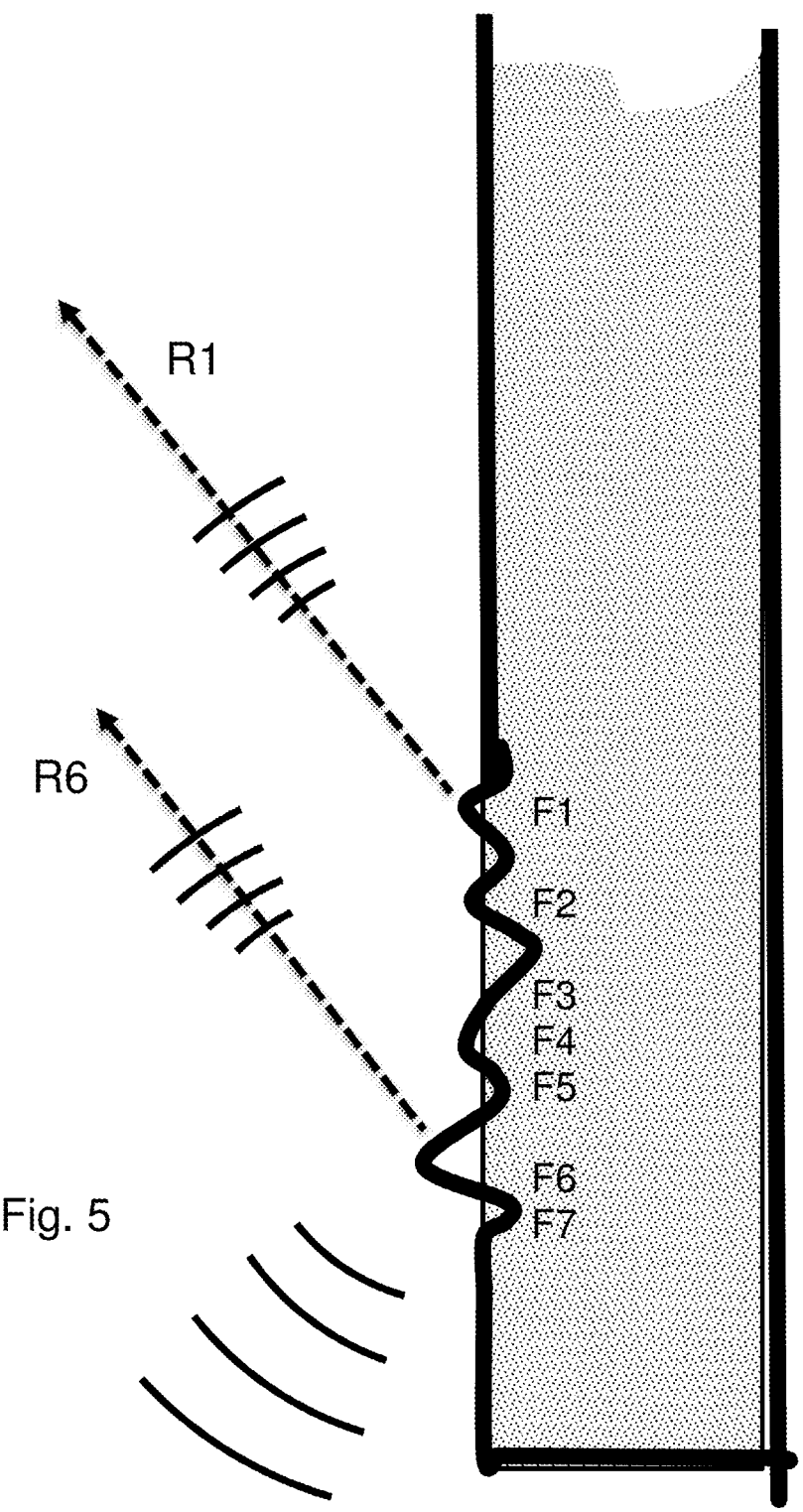
FIG. 5 is a close-up illustration of acoustic reflections from surface features.
Figure 6A:
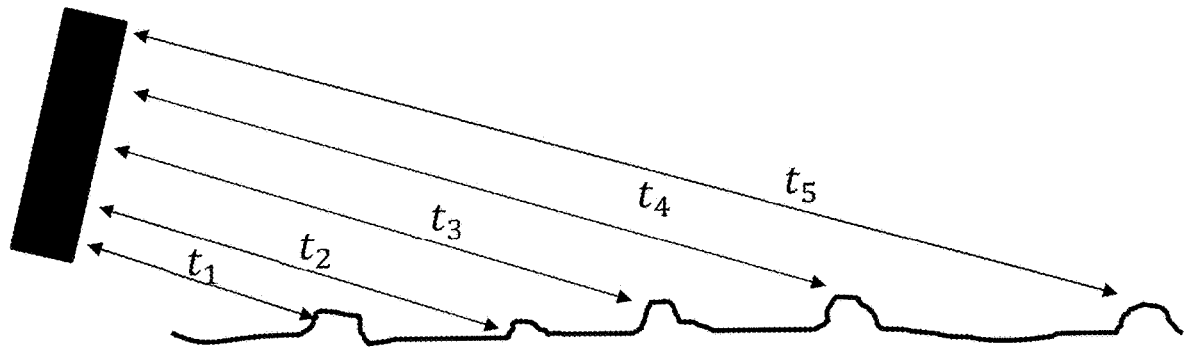
FIG. 6A is an illustration of individual reflections in space and their time of flight.

As shown in FIG. 4, a single wave front is emitted for one scan line 11 at a steep angle towards the surface at area 15. Each surface feature F1-Fn reflects back a small pulse R1-Rn in FIG. 5. The Time of Flight of each reflected pulse determines the distance from the transducer. The amplitude of each reflected pulse increases with the size of the feature normal to the transducer, attenuated by the distance traveled in the fluid. FIG. 6A shows the TOF (t1-t5) off various features. The reflection amplitudes captured by the transducer are plotted with their TOF (t1-t5) to create the signal graph of FIG. 6B, including added noise signals n1-n3.

Thus features near the element return reflections before those further away, and via the TOF conversion, the processor can compute the locations of reflections relative to the sonified area 15. The axial location (relative to the transducer) of a feature i depends on its time-of-flight (TOF), Speed of Sound in the fluid (SoS) and the constant angle of incidence $\alpha$ (typically equal to $\beta/2$ when the tool and tubular axes are aligned) by:

$$\text{Location}_i = TOF_i \frac{SoS}{2} \Big/ \sin(\alpha)$$

Angle of Incidence

Figure 7A:
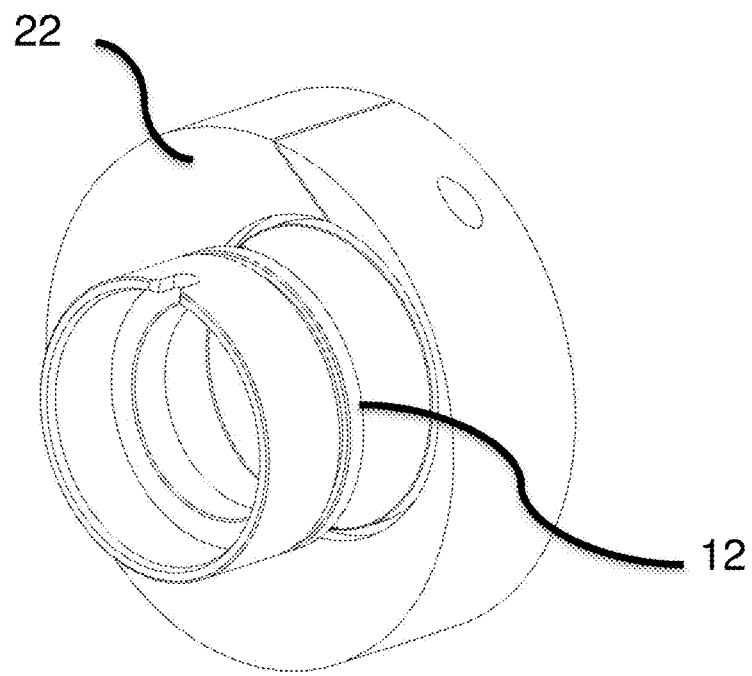
FIG. 7A is a side view of an imaging device with a reflector
Figure 7B:
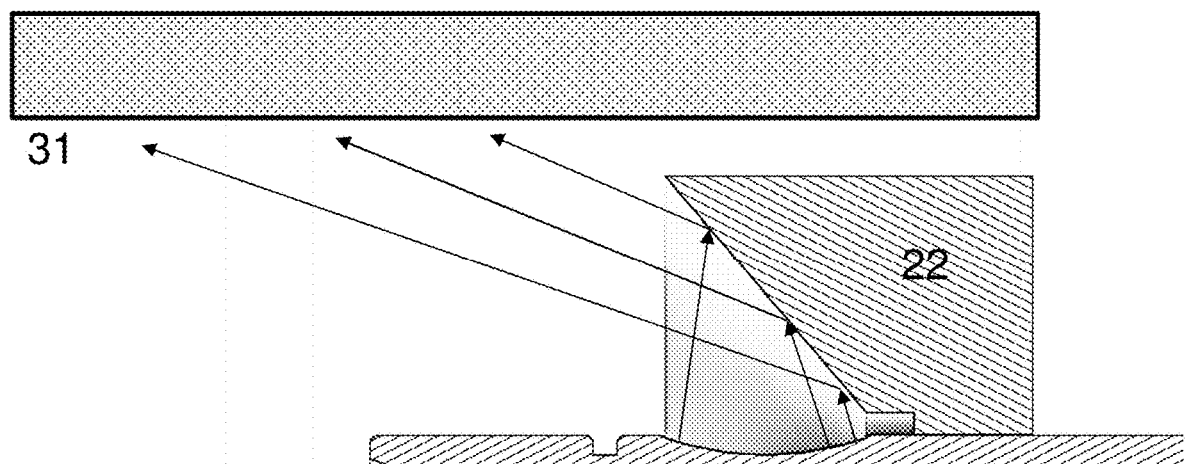
FIG. 7B is a side view of acoustic waves projected along a surface using a reflection.

The high angle of incidence may be obtained by fixing the face of the transducer at the desired angle (see FIG. 4) or by providing a reflector 22 that cooperates with the transducer face to achieve the desired angle (see FIG. 7B). In either case, curvature of the transducer lens or reflector may be designed to set the focal point and sonified area.

While a reflector adds noise from its own surface imperfections, it does provide flexibility in the tool design and type of applications possible. Reflectors may be added to existing tools that currently use a radial facing array. Reflectors of different diameters may be selected on site to enable a tool of a fixed size to image tubulars of various diameters. Conversely a fixed angle transducer will sonify an area much further away on larger diameter pipes, with more attenuation of signal through the extra fluid path.

Moreover, means for moving the reflector may be used to change the sonified area. In one embodiment, the reflector is movable with respect to the transducer array, either translatable longitudinally on the housing or rotatable. During operation, the reflector may move relative to the array from a non-interfering position, to an interfering position between the transducer and wall, to set the incidence angle. Movement of the reflector may set a first angle of incidence and then a second (different) angle of incidence. Either the transducer array or reflector may move to change the relative interference. There may also be a partially interfering position, whereby only part of the reflector reflects the sound at the high angle of incidence and the remaining sound continues undisturbed towards the wall. The reflector may be actuated by actuators in the tool housing slide up/down the housing.

Generating and Capturing Reflections

Figure 9:
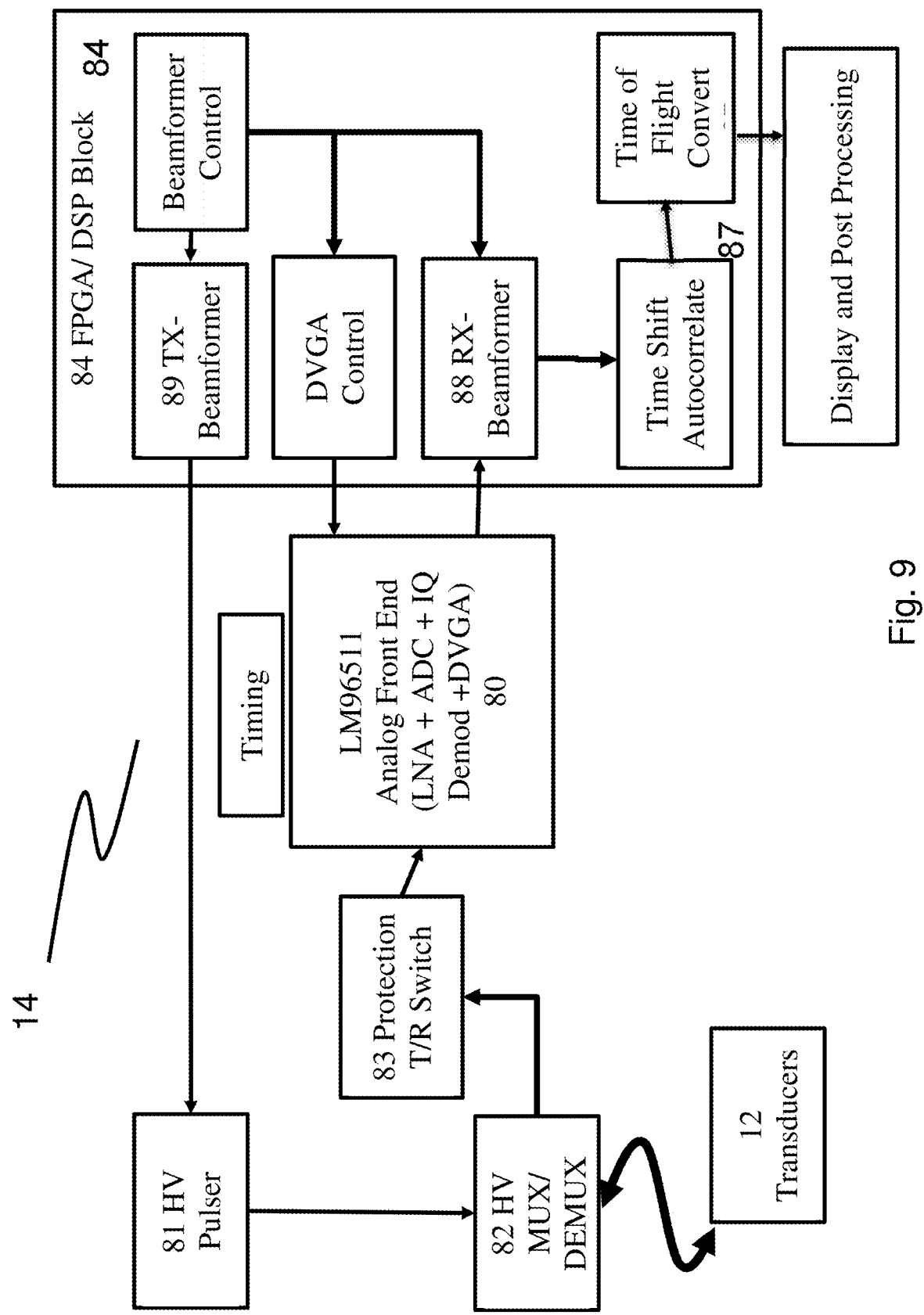
FIG. 9 is a block diagram of a circuit for controlling the transducer array(s).
Figure 10:
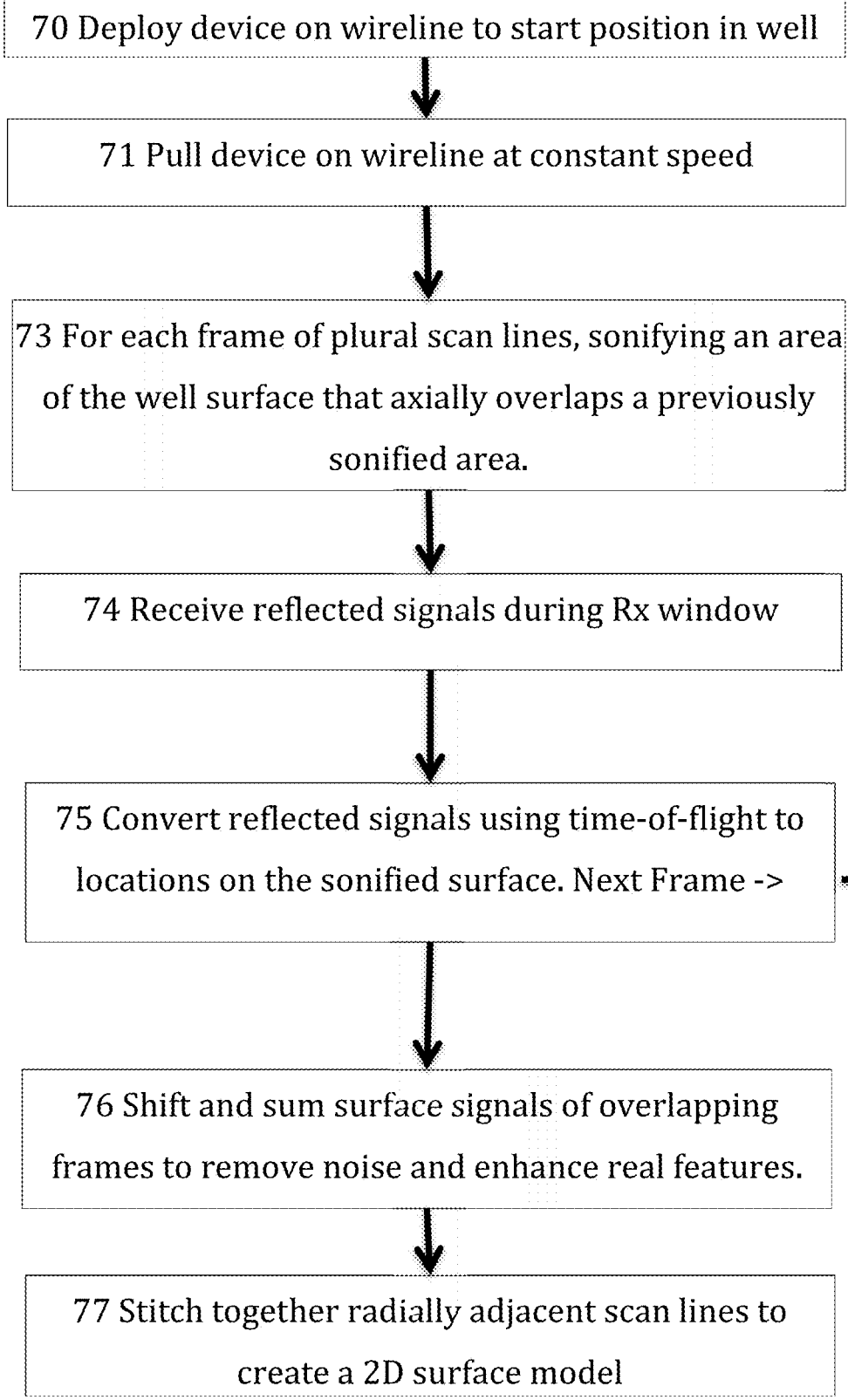
FIG. 10 is a flowchart for operating the device to capture images.

Sections of the tubular are logged by moving the device through the tubular longitudinally, capturing one frame of plural scan lines, every 5-50 millimeters as it moves. Each frame partially overlaps the sonified area in the previous frame to capture features redundantly. Scan lines comprise the transmission and receiving of an acoustic wave at a given azimuthal angle, which wave may be a sinusoidal pulse or characteristic 'chirp'. A scan line may be generated by a single transducer element but is preferably generated by plural phased-delayed elements to transmit a coherent wavefront at a desired radial angle in the active focusing plane, typically normal to the array surface. Specialized Ultrasound circuits exist to drive and receive arrays of ultrasound transducers, such as LM96511 from Texas Instruments, illustrated in FIG. 9.

In a one-dimensional radial array, the beam cannot be focused longitudinally, so this is called the passive focus plane. This focus is set by the lens or reflector geometry. A frame comprises all the active scan lines that are captured in the frame period, where the number of scan lines may correspond to the number of elements.

For example, in prior radial probe systems, the device may move at 1.5 meters/minute scanning slices of the well at 10 frames per second. Thus each scan line in a frame focusses on a spot of the well 2.5 mm long. Reflections from this spot are from all features at this small spot or behind it, so the processor uses this averaged signal. A given spot is not scanned a second time so the processor cannot take averages of several frames or discriminate sub-portions of the spot. Thus the resolution is limited to the spot size. However, at least the reflections are limited to this narrow spot, with a known location.

Conversely in the present arrangement, reflections correspond to all the features in the much larger, de-focused area 15, and the same wave energy is spread thin meaning that the reflected signals are small compared to the noise. However, here the resolution is mostly limited by the precision for discriminating the reflections' Times Of Flight by the receiving circuit, e.g. the sampling frequency, precision of the timing circuit, and ADCs. In a 50 Mhz sampling circuit, adjacent reflections can be separated in TOF by 20 ns (i.e. 30 um in water) long the angled path. This maps to axial resolution by res=30 um/sin($\alpha$), which in the case of a 45-degree transducer corresponds to ~40 um. However, the resolution is more limited by wavelength of the pulse, where a 5 MHz pulse in water is likely to resolve two features as close as 300 um apart.

The area sonified by the directed wave is large compared to prior art ultrasound devices, and presently captures multiple surface features per frame. The transmitted wavefront may be called divergent or defocused at the sonified area. The area receiving the coherent wavefront is larger than the transducer elevation. The sonified area may be 10-50 mm in the axial direction of the pipe with a radial width which is the circumference of the pipe divided by the number of scan lines. Larger areas envelope more features but spread the energy more.

A curvature of the lens or reflector determines the divergence of the beam. The curvature may be convex, concave or flat, provided that the focal point is not the inner surface of the tubular. The skilled person will appreciate that focusing also depends on the relative speed of sound from the lens material to fluid.

In diverging embodiments, the wavefront may have an effective focal point behind the transducer element, i.e. away from the wall and inside the radial array. When a reflector is used, the focal point of the wavefront will be behind the reflector.

In converging embodiments, the wavefront may have a focal point inward of the surface which then spreads out to sonify a larger area at the surface. Alternatively, the wave may be focused radially outward of the inner surface of the tubular, whereby the area sonified at the inner surface is sufficiently large.

A flat transducer can also sonify a desired area of sufficient size, where the spot size is the transducer elevation amplified by the high angle of incidence. Such an arrangement has a focal point of infinity.

Data Processing

Although the wave is defocused across a longer area (in the longitudinal direction) than prior art focused waves, the present system, after data processing, is capable of higher resolution imaging and feature detection. This is achieved through cross-correlation and coherent summation which removes gaussian noise and reinforces real reflections. In a simplified numerical example: logging speed of device 9 m/min (150 mm/s); frame rate 10 FPS (0.1 s/frame); sonified area 60 mm. Thus the device advances 15 mm/frame and each feature is captured 4 times (60 mm/15 mm/frame).

Figure 6B:
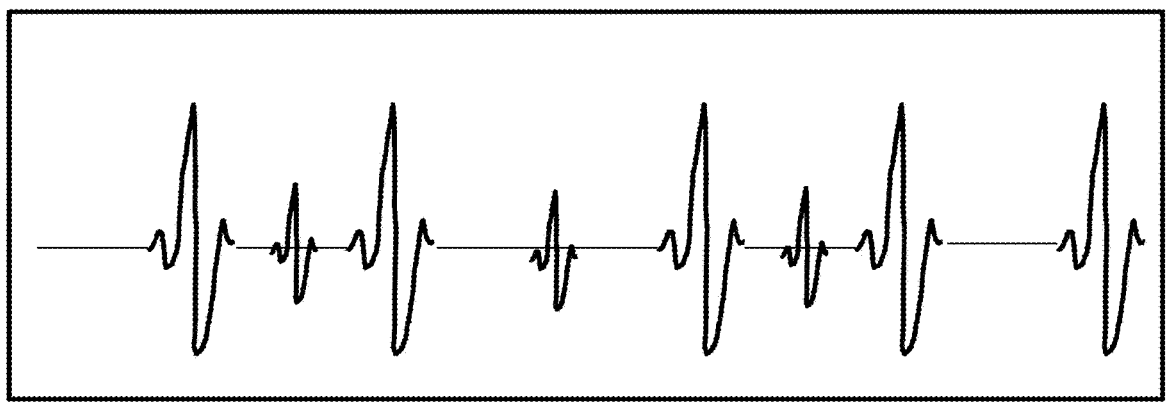
FIG. 6B is a graph of signals in time, corresponding to the reflections in FIG. 6A
Figure 6C:
FIG. 6C is a graph of signals of features at a subsequent frame.
Figure 6D:
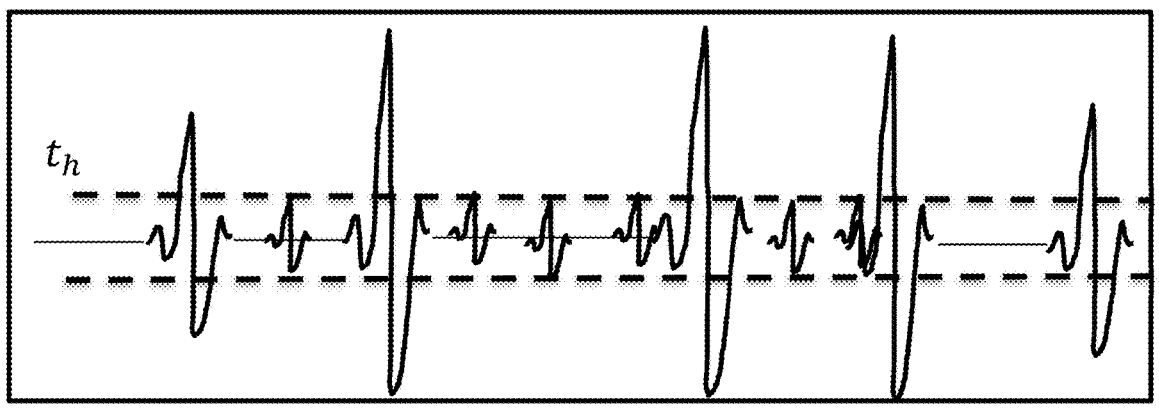
FIG. 6D is a graph of shifted and combined signals.

One advantage of this system is that the large area captured enables a given feature to be observed by the same scan line over multiple frames, where the frames are separated by the inverse of the frame rate. Conversely, Gaussian noises do not repeat in each frame. That is, the system redundantly captures features by partly overlapping the sonified areas in plural subsequent frames. The processor compares two or more frames by shifting the signals in time. The amount of shift is proportional to the logging speed of the tool. The time-shifted signals of plural frames are summed, which has the effect of reinforcing the signals of real reflections that appear in plural frames and cancelling noise that appears in only one frame. FIGS. 6B and 6C shows signals from the same scan line, time separated by a ¼ frame period. In FIG. 6D, the signals are time-shifted back by that ¼ frame period and summed in amplitude. Redundantly captured features 2, 3, 4 are thus doubled and noises n1-n6 may be filtered out (using absolute amplitude threshold $T_h$). Increasing the number of overlapping frames will further increase the signal of real features. A cross-correlation or least square errors approach may be used to find the time-shift that returns optimum coherence. It will be appreciated that the signals to be shifted may be shifted in time or position, as they are equivalent via the time-of-flight conversion.

The cross-correlation operator may be applied to B-mode or preferably the raw RF data. Operating on RF data increases the sensitivity While summing over more frames improves the signal to noise ratio (SNR), it does increase the processing power required. It has been found that combining 3-10 frames balances resolution, SNR and processing power requirements. At four frames overlapping, every frame the features will advance by 25% of the sonified area. Assuming the device is moving at a nearly constant, known speed, the processor can estimate an initial time shift to apply to reflection signals from one frame to the next. From this initial shift estimate, known cross-correlation algorithms can be used to hunt for an optimal shift, where the correlation is maximum.

The shifted and summed (or averaged) signals across multiple consecutive frames may be converted to location data to model the features for a continuous line along the surface. To create a 2D internal surface model, adjacent scan lines are stitched together. FIG. 8B shows a stitched 2D image of the perforated pipe in FIG. 8A, where an entire perforation is captured in one 30×400 sample frame and cross-correlated and summed with the 6 neighboring frames. By capturing an entire perforation in a single frame, the axial scale is preserved despite changes in tool speed and by summing overlapping frames the signal to noise ratio is improved. Axial sampling is 60 um, far beyond what can be achieved with conventional approaches such as slice stacking.

Registration

In prior art systems, location of surface points is estimated from the wireline depth but there is no way to be certain that two subsequent scan lines are immediate physical neighbours. The tool may experience stick/slip motion. In the present system, the processor may use multiple frames to determine and output a registration of features, that is the relative or absolute location of surface features along the tubular.

Multiple features are seen in a single frame. The processor may use trigonometry and Time of Flight conversion to determine the spatial separation of any two features. Moreover, a single feature is seen redundantly in two or more overlapping sonified areas. The processor uses the amount of shift needed to coherently sum frames in order to determine how much the device actually moved between frames or how far offset the features in one frame are from the previous frame. Repeating these calculations, the processor is able to build up the axial registration of all features to create a surface model of the tubular. For completeness, in a radial array, the radial registration of features is known from the radial separation of elements that capture them.

Uncased Wells and Formation

While the device and data processing are suited to generally smooth surfaces found in metal tubulars, they may also be used to image and evaluate uncased wellbores. This is especially useful in bores drilled into tight, hard rock, where the surface features captured include texture from drilling and natural fractures in the formation. The edges of natural fractures return bright 'glints' at their edges. The location and quantity of these fractures are processed to evaluate the state of the formation for oil production, before and after hydraulic fracturing.

The surface texture of uncased wells may be indicative of the drilling operation. By processing the pattern of features, the texture may be determined and used to evaluate the quality of the drilling in real-time, known as logging-while-drilling.

Movable Transducer Pad

Figure 11:
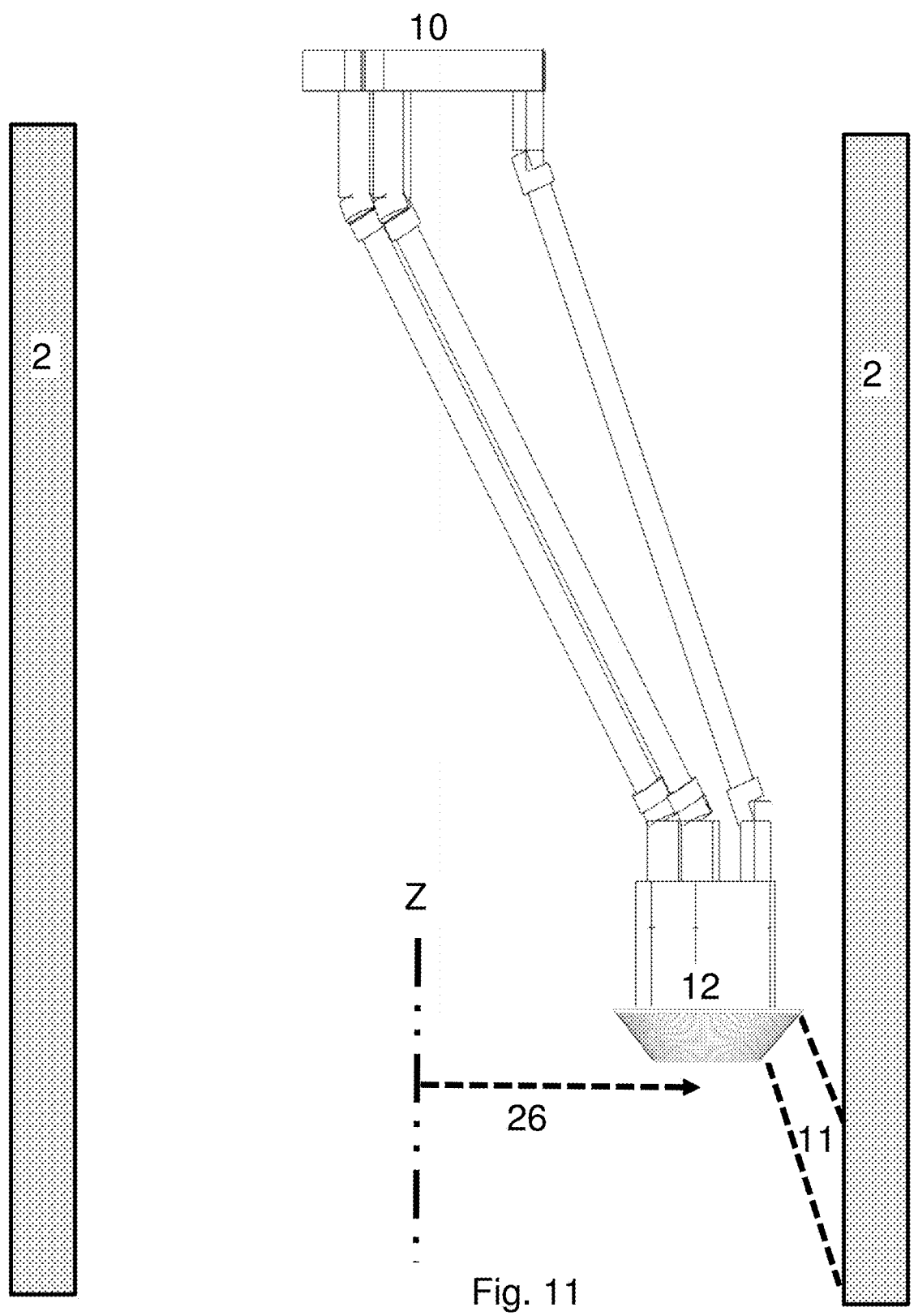
FIG. 11 is a laterally extendable transducer.

In larger diameter tubulars, the sonified area on the surface increases for divergent waves and the signal is more attenuated by the increased path through the fluid. In one embodiment, shown in FIG. 11, the device comprises a mechanism for laterally translating or radially extending the transducer 12 from an axially centered position towards the tubular 2. The lateral movement 26 is perpendicular to the device axis Z to some offset from the wall.

The device and translation mechanism may be a robot as described in patent application GB2572834 on 16 Oct. 2019, entitled "Device and Method to Position an End Effector in a Well," which is hereby incorporated herein by reference. The preferred embodiment therein is a Delta configuration for lateral translation with little commensurate axial displacement. The transducer 12 is connected to an end effector connected to one end of and translated by linkages, which are connected at their other end to the body of the device 10. The remaining body of device 10 is not shown in FIG. 11 for simplicity. The transducer face is preferably moved within 5 centimeters of the surface of the tubular. Thus the distance traveled by the sound wave may be reduced by at least 50% compared to a fixed transducer in a large tubular.

As described in GB2572834, a further actuator is provided to rotate the end effector and transducer about the longitudinal axis Z, while scanning, such that the entire surface of the tubular is captured.

Yet another of the actuators may extend the transducer axially to controllable interfere with the reflector 22. As described above, the relative position of transducer and reflector may move between a) an interfering position to capture pure surface features and b) a non-interfering position to capture thickness features.

Depth Data

In the embodiments above, the time of flight is used to detect surface features, rather than to acquire depth information (where waves would penetrate the surface and reflect off voids and outer walls). Thus there is very little depth data using purely high incident angled waves.

In an alternative embodiment, some of the transmitted acoustic wave is directed radially towards the wall and reflected back from features at various depths. This may be accomplished by 1) a bi-focal transducer top layer or lens that directs a first part of the wave radially and a second part at the acute angle, 2) a reflector that is partially acoustically transparent and partially reflective or 3) a reflector physically located to interfere with only part of the wave and not interfere with another part of the wave.

The proportion of the wave that should be transmitted radially or acutely depends on the relative strength of the signals required to return useful data. At high angles, the waveform travels a greater distance and experiences less specular reflection, so a higher proportion of the energy is preferably directed acutely than radially.

The radial distance to the inner (and even the outer) wall is sufficiently closer than the nearest point of the acute angle field of view, such that the time of flight of their reflections are distinguishable by the data processor. Thus the first and second reflections will correspond to the inner and outer wall respectively (potentially followed by additional reflections from wall-to-wall reverberations and voids), subsequently followed by surface reflections from features from the nearest to furthest part of the acute field of view. In a tubular of an expected diameter and a fluid of an expected speed of sound, the processor can set time thresholds, to separate radial reflections from acute reflections.

Thus, in these arrangements, depth data is retrieved at the same time as surface data. The processor may create a 3D model by combining these two signals. Since the locations of these two signals are physically offset, the processor offsets them by a corresponding amount of time before combining them.

This processing also helps with registration of the acute angle reflections. The radial wave may be beam focused to a narrower spot on the surface than the acute angle wave to provide a precise location for those reflections. The first reflection will correspond to the surface at the radially-facing location, and therefore the processor can adjust the offsets to find the surface feature most similar to this within the acute reflections.

For example, a dent, crack or perforation may be detected in the radial reflection as a suddenly longer TOF than the surrounding radial reflections (i.e. from prior and later frames). These surface features are given a precise location in the model mapping. As the device moves longitudinally, the acute angle reflections will return glints/strong reflections from the wall of these surface features, albeit with less location precision.

From knowledge of the geometric offset, the frame rate (fps) and speed of the device the processor can estimate the number of frames to offset between a radial scan and the corresponding acute angle scan. The exact number of frames to offset is determined by identifying corresponding surface features, such as the edge of a perforation.

Centralizing Elements

The imaging device 10 may also include one or more centralizing element for keeping the imaging device in the center of the well. FIG. 1 illustrates one embodiment of a centralizing element 18, wherein the element includes centralizing rods that extend outwardly and abut the inner wall of the well casing or liner to keep the imaging device in the center of the well.

Deployment System

The imaging device includes a deployment system 16 for running the imaging device 10 into the well and removing the device from the well. Generally, the deployment system is a wireline or coiled tubing that may be specifically adapted for these operations. Other deployment systems can also be used, including downhole tractors and service rigs.

Power & Memory System

The imaging system can be powered by an electric cable run from the well surface or by onboard batteries. The data from the imaging system can be conveyed uphole to the well surface through a transmission line for immediate viewing of the images in real-time. The data may also be stored onboard the imaging device for later retrieval in the event of a communication loss. The imaging system may record images continually or it may be triggered manually and/or automatically, such as through the use of movement triggers.

Rendering

The reflection signals may be displayed to a user in their raw signal form, whereby the 2D image is created from pixels separated by the signal's Time of Flight, and wherein pixel brightness is proportional to signal strength.

With further processing, a 2D geometric model may be created by stitching together cross-correlated signals in the axial direction and neighbouring scan lines in the radial direction. The appropriate scaling is provided by converting the TOF to position data. A geometric model represents the surface features spatially (in radial and depth coordinates) and may be stored or displayed in their native polar form or unrolled as a flat surface.

It will be appreciated that data processing may be performed with a processor on the device, at the uphole operations site, or on a remote computer. The term 'processor' is intended to include computer processors, cloud processors, microcontrollers, firmware, FPGAs, and electrical circuits that manipulate analogue or digital signals. While it can be convenient to process data as described herein, using software on a general computer, many of the steps could be implemented with purpose-built circuits.

Although the present invention has been described and illustrated with respect to preferred embodiments and preferred uses thereof, it is not to be so limited since modifications and changes can be made therein which are within the full, intended scope of the invention as understood by those skilled in the art.

The invention claimed is:

1. A system for inspecting an inner surface of a tubular, the system comprising:
an image device having an ultrasound transducer and an elongate housing defining an axial direction, the ultrasound transducer arranged to sonify an area of the inner surface of the tubular with an ultrasound pulse at an angle of incidence non-normal to a longitudinal axis of the housing so that the ultrasound pulse intercepts axial locations of said area at different times; and
a processor arranged to receive reflection signals from the transducer and to interpret the reflection signals using time of flight of the reflection signals as a respective axial location of each of a plurality of features on the inner surface of the tubular causing the reflection signals.

2. The system of claim 1, wherein the ultrasound transducer comprises a plurality of transducer elements, the system further comprising a circuit to activate a subset of the transducer elements as a phased array to sonify the area and to receive reflections.

3. The system of claim 2, wherein the transducer elements are separated radially around the housing, emitting and receiving phased scan lines at multiple azimuths of the image device.

4. The system of claim 1, further comprising apparatus for moving the image device axially through the tubular.

5. The system of claim 4, wherein the processor is further arranged to shift and combine signals from the transducer at a plurality of partly overlapping sonified areas.

6. The system of claim 1, wherein the processor is further arranged to calculate attributes of the reflection signals and identify surface features from those attributes.

7. The system of claim 1, wherein the ultrasound transducer is arranged to emit a defocused beam to the sonified area.

8. The system of claim 1, wherein the sonified area is longer than 5 mm in an axial direction of the tubular, preferably longer than 10 mm.

9. The system of claim 1, wherein the angle of incidence is between 20 and 70°, measured from a surface normal to a longitudinal axis of the housing.

10. The system of claim 1, further comprising a reflector arranged to reflect ultrasound waves from the transducer to the sonified area.

11. The system of claim 1, wherein a focal point of the transducer is one of: radially inward of the transducer; radially inward of the inner surface, radially outward of the inner surface, or at infinity.

12. The system of claim 1, wherein the transducer is arranged to rotate about the axial direction of the housing and sonify the surface at plural azimuths.

13. A method of operating an imaging device comprising an ultrasound transducer to inspect a tubular, the method comprising:

deploying and moving the imaging device axially through a tubular;

generating an ultrasound pulse with the ultrasound transducer to sonify an area of the inner surface of the tubular, which pulse is emitted at an angle of incidence such that said pulse intercepts axial locations of the sonified area at different times; and processing reflection signals from the transducer using time of flight of the reflection signals to determine a respective axial location of each of a plurality of features on the surface of the tubular causing the reflection signals.

14. The method of claim 13, repeating the step of generating an ultrasound pulse, to sonify multiple areas that are partially axially overlapping.

15. The method of claim 14, further comprising shifting and combining reflection signals from the multiple sonified areas to remove noise and reinforce reflections from the plurality of features.

16. The method of claim 14, further comprising processing at least some of the reflection signals from the multiple sonified areas to calculate registration of features on the surface.

17. The method of claim 13, wherein the imaging device is moved through the tubular at a speed relative to a frame rate, such that surface features are captured by multiple frames, preferably at least 3 frames, more preferably at least 5 frames.

18. The method of claim 13, wherein the incidence angle is between 20 and 70°.

19. The method of claim 13, wherein the ultrasound transducer comprises a radial array of transducer elements, sonifying the surface at plural azimuths of the device in a frame.

20. The method of claim 19, further comprising stitching together radially adjacent reflection signals from each frame to render slices for a geometric model of the tubular.

* * * * *